(12) United States Patent
VanBlon et al.

(10) Patent No.: US 10,725,604 B2
(45) Date of Patent: Jul. 28, 2020

(54) VIRTUAL NOTIFICATIONS

(71) Applicant: Lenovo (Singapore) Pte. Ltd., Singapore (SG)

(72) Inventors: Russell Speight VanBlon, Raleigh, NC (US); Carlos Munoz-Bustamante, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 258 days.

(21) Appl. No.: 15/085,578

(22) Filed: Mar. 30, 2016

(65) Prior Publication Data
US 2017/0285878 A1 Oct. 5, 2017

(51) Int. Cl.
*G06F 3/048* (2013.01)
*G06F 3/0481* (2013.01)

(52) U.S. Cl.
CPC ........ *G06F 3/0481* (2013.01); *G06F 3/04817* (2013.01)

(58) Field of Classification Search
CPC .......................... G06F 3/04817; G06F 3/04842
See application file for complete search history.

(56) References Cited

U.S. PATENT DOCUMENTS

| | | | |
|---|---|---|---|
| 2008/0177835 A1* | 7/2008 | Chaar | G06F 3/0482 709/204 |
| 2009/0144655 A1* | 6/2009 | Hardy | G06Q 10/107 715/803 |
| 2011/0246916 A1* | 10/2011 | Leskela | G06F 3/0488 715/765 |
| 2012/0209650 A1* | 8/2012 | Romagnino | G06Q 10/06 705/7.15 |
| 2014/0081156 A1* | 3/2014 | Ohsawa | A61B 5/1123 600/483 |
| 2014/0344375 A1* | 11/2014 | Hauser | H04L 51/04 709/206 |
| 2016/0283044 A1* | 9/2016 | Ohsawa | G06F 3/0481 |

* cited by examiner

*Primary Examiner* — Claudia Dragoescu
(74) *Attorney, Agent, or Firm* — Ference & Associates LLC

(57) ABSTRACT

One embodiment provides a method, including: detecting, at an electronic device, data; repurposing, using a processor, an output based on the data; and providing, using an output device of the electronic device, the repurposed output as a notification. Other embodiments are described and claimed.

27 Claims, 6 Drawing Sheets

VIRTUAL NOTIFICATIONS

BACKGROUND

Information handling devices ("devices" or "electronic devices"), for example laptop computers, smart phones, tablet devices, smart watches and wearables, and the like, are utilized for communicating, calendaring, to make purchases, and in many other daily tasks. Users often set or receive notifications, e.g., for events. For example, devices detect an event, e.g., a calendar appointment that has come due, an incoming text message, etc., and provide a notification, alert or reminder for the event ("notification," "alert," and "reminder" are used interchangeably herein). Common examples include notifications for voice calls, text messages, instant messages, in-application messages, video calls, etc. Such devices also provide the user with notifications regarding events such as scheduled reminders, alarms, etc.

Notifications typically are provided to the device user in the form of a visual display. For example, many smart phones include a tray or screen area in which notifications (e.g., of received text messages, missed calls, etc.) are displayed. Different modes of notification, however, may used to provide a notification. For example, a device may provide audible notifications, on-screen notifications, other visible notifications, haptic notifications such as device vibrations, etc., alone or in some combination.

BRIEF SUMMARY

In summary, one aspect provides a method, comprising: detecting, at an electronic device, data; repurposing, using a processor, an output based on the data; and providing, using an output device of the electronic device, the repurposed output as a notification.

Another aspect provides a method, comprising: detecting, using a processor of an electronic device, an event; displaying a notification for the event; identifying, using the processor, data indicating that the event has occurred, wherein said data is not obtained from user input at the electronic device; and automatically clearing the notification based on the data.

Another aspect provides an apparatus, comprising: an output device; a processor operatively coupled to the output device; and a memory that stores instructions executable by the processor to: detect data; repurpose an output based on the data; and provide, using the output device, the repurposed output as a notification.

A further aspect provides a program product, comprising: a computer readable storage device comprising code executable by a processor, the code comprising: code that detects, at an electronic device, data; code that repurposes, using a processor, an output based on the data; and code that provides, using an output device of the electronic device, the repurposed output as a notification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
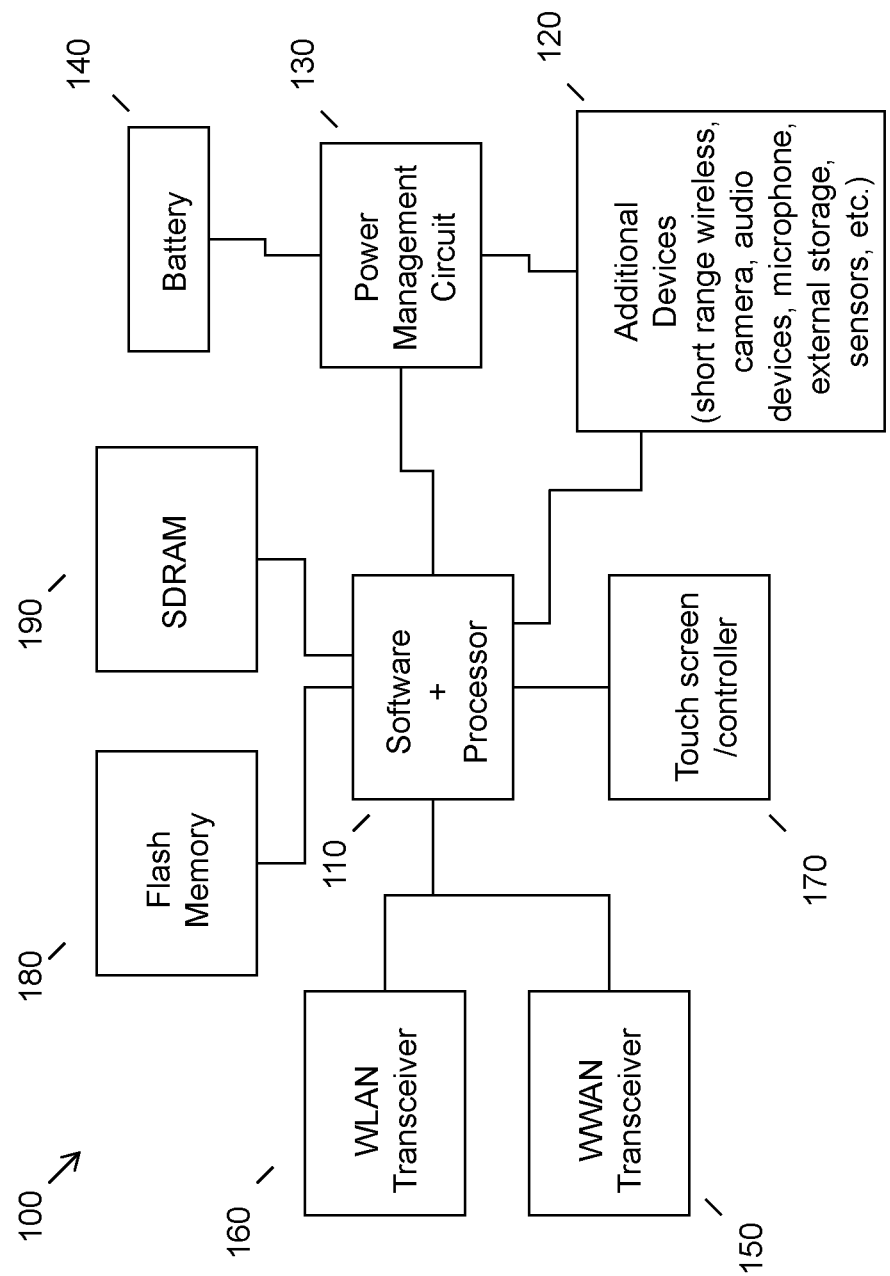
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While many notification types exist, a user must deal with conventional notifications or let the notification tray or area get unwieldy. Clearing a notification to make it go away also sometimes causes the user to forget about the notification. Furthermore, notifications must be cleared or acknowledged manually, even if the event associated with the notification has taken place.

An embodiment therefore provides for virtual notifications that alert the user of something in a different way than conventional notifications. For example, a conventional notification may take the form of a point-in-time visual notification, e.g., a pop up display of text contained within a notification window, which the user has to keep track of and defer or cancel. In contrast, an embodiment instead provides a soft or virtual notification that utilizes a repurposed output, such as a display screen background color that is changed to provide a notification, a background color on a sub-portion of the display screen that is changed (e.g., a task tray or notification bar), a color surrounding an application or application icon that is changed, a change to a home screen application icon or badge, a relocation of an application icon or badge (within a screen or between screens), etc., as the notification. This virtual notification can become active in any or all of the user's devices.

According to an embodiment, a virtual notification doesn't have to always show up or always persist. For example, a virtual notification may only be implemented or displayed at certain times, such as when the user is using a particular device, or when the user is at a particular location (geographic location or virtual location, such as a web site), or at particular times when the user will be near or at a particular location (e.g., grocery store, web site, device application, etc.).

In an embodiment, a notification may be automatically cleared, e.g., based on a policy. For example, an embodiment may use data (e.g., data that is sensed, such as location data, data that is external to the device, such as purchasing or transactional data, data that is available to a device application, such as browser history data, etc.) to determine that the event or task for which a notification is created has been addressed or completed by the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a short range wireless device for communicating with other devices. System 100 often includes a touch screen 170 for data input and display/rendering. System 100 also typically includes various memory devices, for example flash memory 180 and SDRAM 190.

Figure 2:
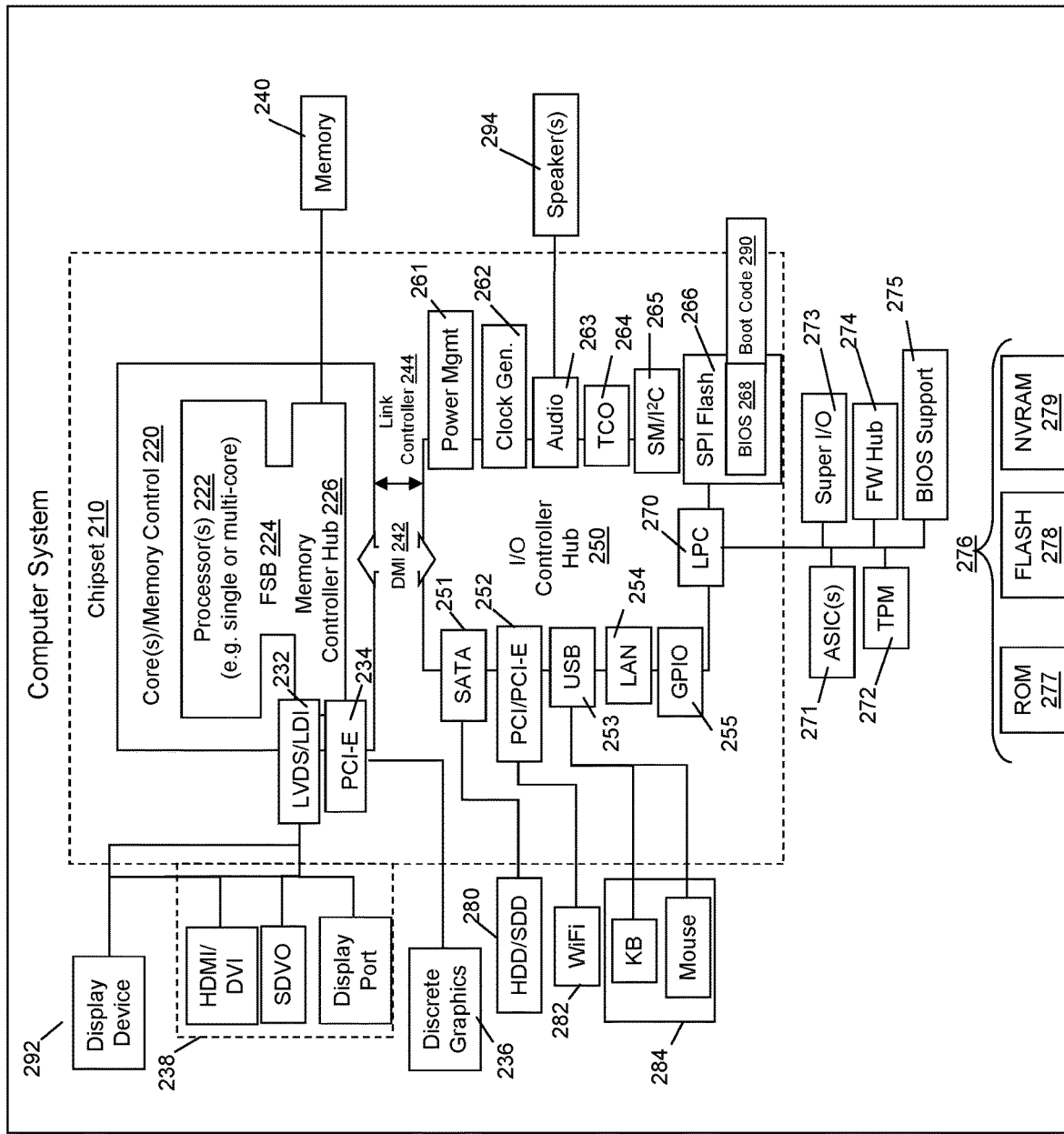
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide notifications to users. The notifications comprise indications that an event has occurred or will occur. For example, a notification may be provided in response to an event, e.g., a message that has been received by a device. As another example, a notification may be provided that another type of event has occurred, e.g., it is 15 minutes before a calendar appointment will occur or a reminder comes due.

The virtual notifications described herein may take a variety of forms and may be provided in a variety of ways.

In the non-limiting examples used herein, a displayed virtual notification is used. However, it will be readily apparent that other virtual notifications, for example audible notifications, haptic notifications, etc., may be employed instead of or in addition to a displayed virtual notification, as determined for example from the use context, the user's preferences, the device capabilities, etc.

Figure 3:
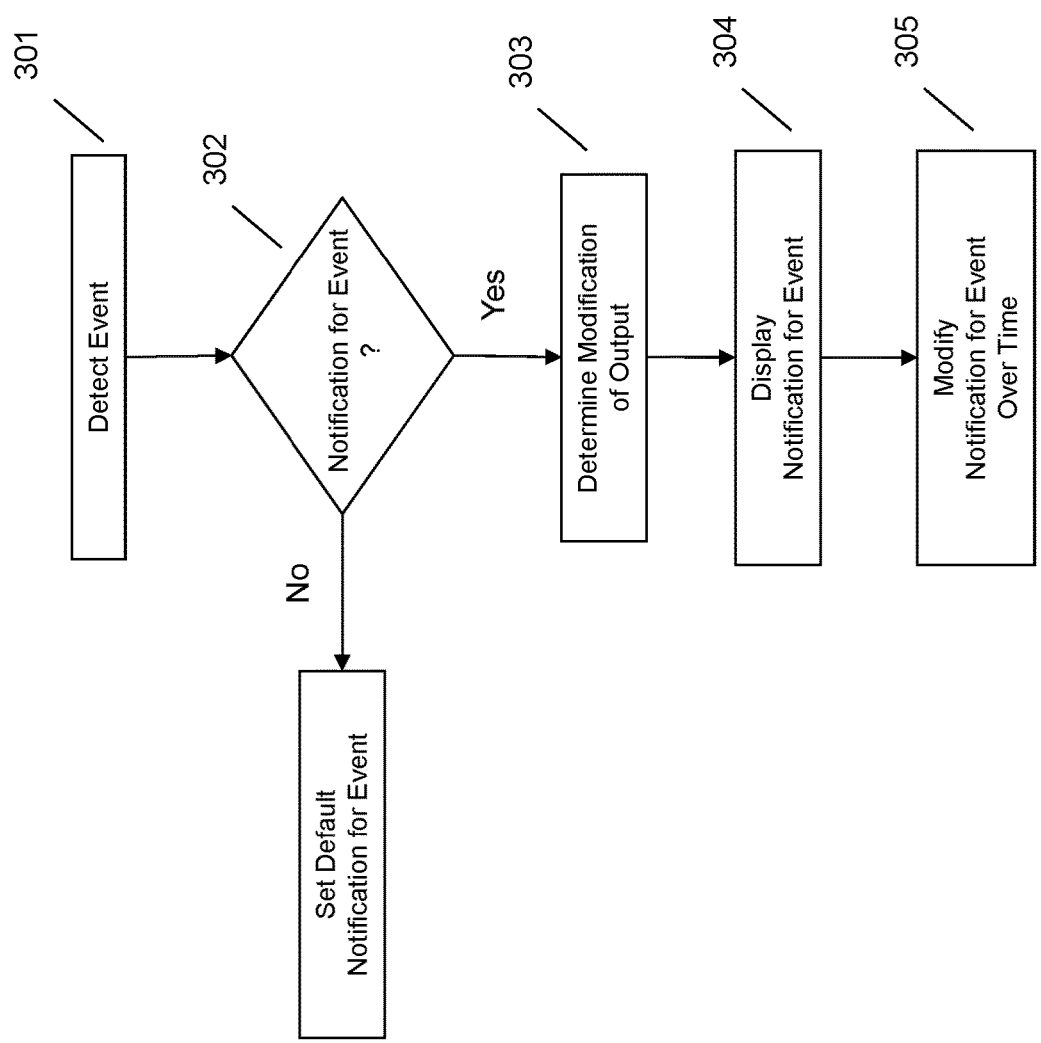
FIG. 3 illustrates an example method of setting a virtual notification that is modified over time.

Illustrated in FIG. 3 is an example of providing a virtual notification that alerts or reminds a user of an event. At 301, an event is detected. For example, a user may request that a virtual assistant place an item in a wish list such that the user is reminded to purchase the item later, e.g., in a week. Therefore, in this particular example, the event is the creation of a reminder for purchasing the item in one week.

A standard notification or alert in this use context might be a pop up text notification window that is displayed at a set time, e.g., one day prior to the end of the week time period. As is conventionally known, the user must acknowledge and cancel or defer this type of conventional notification.

Thus, an embodiment instead identifies a virtual notification that may be used, as illustrated at 302, for notifying the user of the event. In an embodiment, an output such as display screen color, application icon or graphic size and/or location, etc., may be modified or repurposed for use as a virtual notification.

For example, an embodiment identifies a notification, such as a background color for a display screen (or portion thereof), to use as a virtual notification for the event at 302. This identification may proceed according to a setting chosen by the user or according to a default setting. For example, at 302 an embodiment may identify that a virtual notification option has been selected by the user. Of course, if no such virtual notification setting is indicated, a default notification may be used, e.g., popup text window.

When a virtual notification has been identified, e.g., a user has enabled the use of a displayed color as a virtual notification; it may be displayed on the display device for the user, as illustrated at 304.

By way of specific example, in an embodiment the virtual notification may utilize colors in a variety of ways. For example, a red background color for a notification bar may indicate charging the device's battery is needed or recommended, a green background color for the notification bar may be used as a reminder to buy an item, as per the non-limiting example used above, a yellow background color for the notification bar may indicate that a reminder has been set to stop at a particular location on the way home from work, etc. Therefore, an embodiment may modify an output, e.g., repurpose the default color of the notification bar to a new color as the virtual notification, as illustrated at 303.

In an embodiment, the virtual notification may be modified over time. Thus, an embodiment may determine a modification of the virtual notification, as illustrated at 305. For example, as a virtual notification may be a background color on the home screen, a change to a particular home screen application icon or badge, a temporary relocation of an application icon or badge, etc. A modification may include a rate at which the background color changes, an amount by which the size of an application icon changes, a particular location to which an application icon is to relocated, etc.

When a modification to an output has been determined at 303, a virtual notification that is displayed, as illustrated at 304, may be modified according to the time based modification, as illustrated at 305. By way of specific example, if the virtual notification identified comprises a color change to the background color of a device's notification bar, e.g., to remind the user to purchase an item by week's end, the notification bar itself may change color over time to indicate a task, a to-do item, an upcoming event, etc., is approaching. In contrast, conventionally a device's notification bar is always a static color, and this static color is non-function, i.e., it is not linked to any notification, reminder or alert. In an embodiment, the initial virtual notification displayed at 304 may be a neutral color, e.g., grey, whereas a modified virtual notification displayed at 305 may be red, e.g., to indicate that an upcoming event, here a purchase of an item within a week's time, is drawing nearer in time. Similarly, a change in color may be a change to the intensity of the color, the transparency of the color, etc.

An embodiment may identify a virtual reminder at 302 in response to determining that a default/conventional notification has been set. For example, a default/conventional notification may be supplemented by or transitioned into a virtual notification. By way of example, if a user inputs default/conventional reminders for an event at one day before, four hours before, one hour before, and fifteen minutes before a calendar appointment, an embodiment may implement a single virtual notification instead of or in addition to the separate default/conventional notifications leading up to the event. The virtual reminder may be a single, persistent virtual reminder that does not change, or, the virtual reminder may be one that is modified over time. For example, an embodiment may implement a virtual reminder that has multiple tiers that track the progression of the default/conventional reminders. Thus, if the virtual reminder displayed at 304 is a background color, the background color may be modified at 305 repeatedly to change the background color to from semi-transparent red at one day before the event to a darker, more opaque red background color as the event time approaches, e.g., one color or transparency change per standard reminder time increment.

The virtual notification(s) can become active and be displayed by or provided by any or all of the user's devices. For example, a virtual notification generated by a user's laptop or smart phone may appear on a user's smart watch or other linked device.

Figure 4:
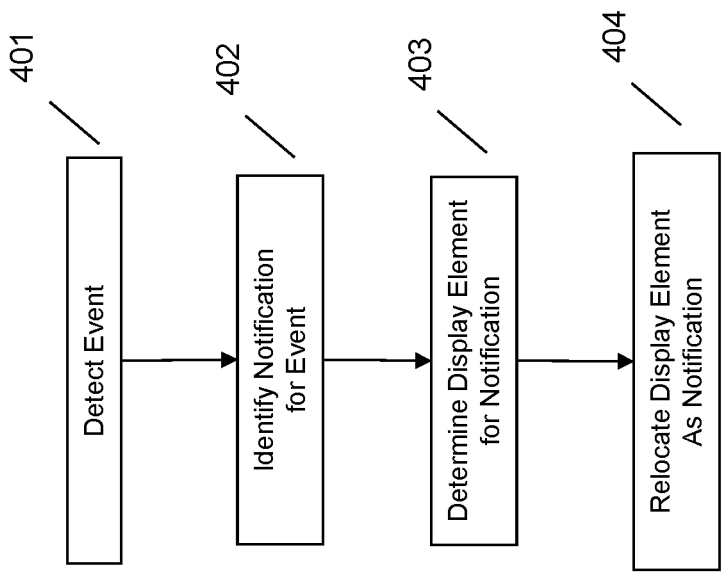
FIG. 4 illustrates an example method of implementing a virtual notification.

In an embodiment, as illustrated in FIG. 4, a virtual notification may be provided in the form of a relocated display element. Therefore, if an event is detected at 401, e.g., an in-application message is received in a smart phone application; an embodiment may identify a notification for the event at 402. For example, in lieu of or in addition to a default notification, such as a text notification provided in a status bar, a flashing light in a display bezel, the appearance of a number on the application's icon or badge, etc., an embodiment may identify a virtual notification in the form of relocating a display element, as illustrated at 403. By way of specific example, an embodiment may determine at 403 that the application's icon is to be relocated within the display, e.g., to place it in a more prominent or noticeable position within a display view. This is the digital equivalent of putting an item in your house so you have to step over it until you finally deal with it or put it away. Thus, the virtual notification may be implemented in the form of relocating the display element, e.g., an application icon, within the display, as illustrated at 404.

Figure 5:
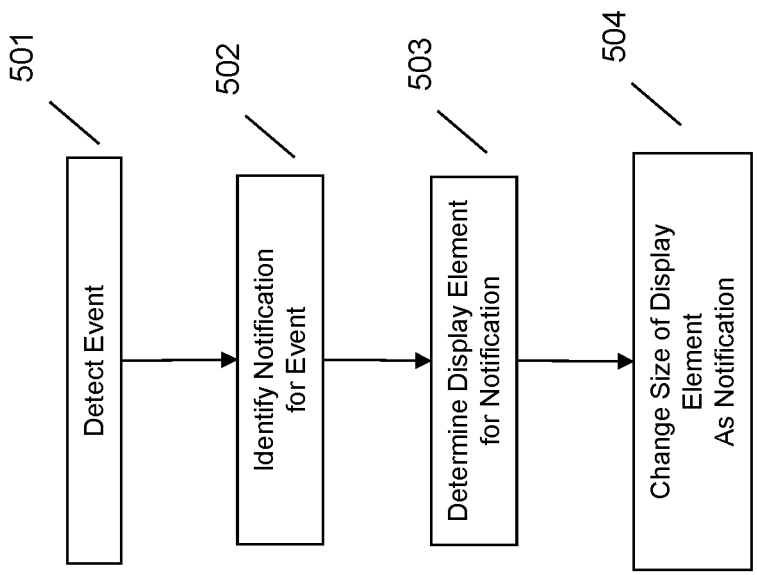
FIG. 5 illustrates another example method of implementing a virtual notification.

Another example of implementing a virtual reminder is illustrated in FIG. 5. Here, a virtual notification may be provided in the form of a change in the size of display element. Therefore, if an event is detected at 501, e.g., a social media application status update is received in a smart phone application, an embodiment may identify a notification for the event at 502. For example, in lieu of or in addition to a default notification, such as a text notification provided in a status bar, a flashing light in a display bezel, etc., an embodiment may identify a virtual notification in the form of a size change to a display element at 503. For example, an embodiment may determine at 503 that the application's icon is to be changed in size, e.g., to increase it's size such that it is more prominent or noticeable. Thus, the virtual notification may be implemented in the form of increasing the size of the display element, e.g., an application icon, within the display, as illustrated at 504.

Figure 6:
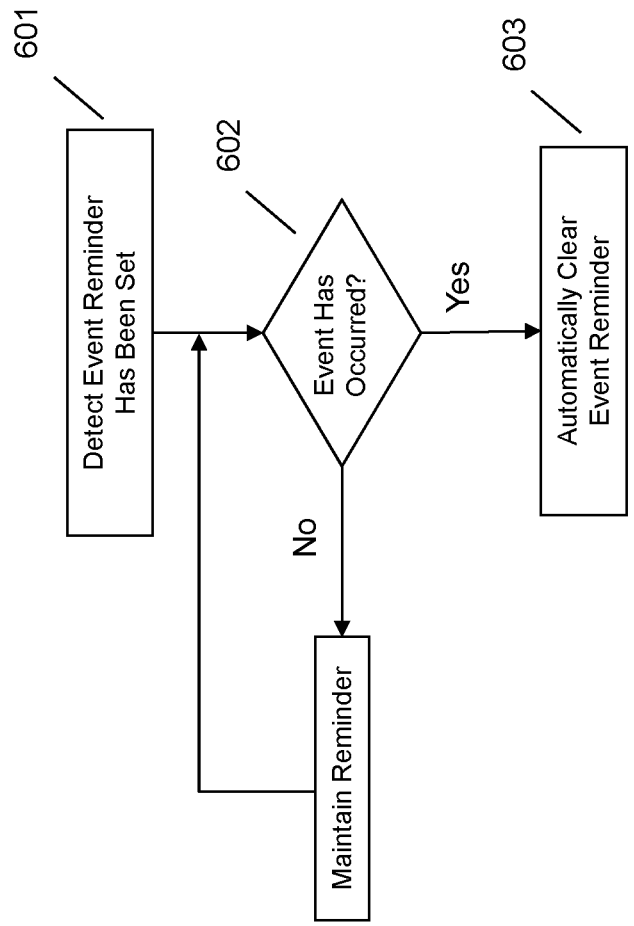
FIG. 6 illustrates an example method of automatically clearing a notification.

Referring to FIG. 6, an embodiment offers improved techniques for clearing of notifications, whether a virtual notification, a default/conventional notification, or both. In an embodiment, the fact that an event reminder has been set is detected at 601, e.g., a calendar appointment is detected for a particular place and time. An embodiment determines if the event for which the reminder or notification is set has occurred at 602. If not, the reminder or notification may be maintained. However, if the event has occurred, an embodiment acts to automatically clear the reminder or notification at 603.

By way of specific example, if a user sets a calendar appointment to meet with a particular person, at a particular time and place, this is detected by an embodiment at 601. Thereafter, if data is available that indicates that the event has occurred, here for example, data indicating that the particular person's device is detected via short range wireless communication, data indicating that the user's device is within a particular meeting room at a particular time, data indicating that the user's device has called a dial in number for the meeting, etc., an embodiment uses this data to determine that the event has occurred at 602 and thereafter an embodiment automatically clears the reminder at 603.

Thus, using an embodiment, when a user stops at a required location, buys a required item, visits a particular web site, etc., such data is used to determine that a notification (virtual or conventional) is to be automatically dismissed. This is in contrast to conventional approaches, which require a user to manually dismiss a notification.

By way of specific example, an embodiment may detect, e.g., via GPS data, that a user has went to a location associated with a reminder event. This GPS data (or related data, such as map application data) may thus be utilized by an embodiment to reset or dismiss a virtual notification for the event associated with the location. Therefore, if a user arrives at the event location, the virtual notification is automatically dismissed.

Other data sources may be used, e.g., in lieu of or in addition to location data. For example, an embodiment may utilize transactional data to determine that a user has made a purchase associated with a reminder event, e.g., using a credit card or virtual wallet application data. Other sources of transactional data are also available. For example, an external purchase (even at a brick and mortar store) may be used to dismiss a virtual notification, as credit cards email or send an SMS text message to user's devices, e.g., when buying certain things from certain stores. An embodiment may utilize this reported transactional data to infer that a task such as purchasing an item on a wish list has taken place. For example, a user may share purchase history data with a shopping list application or service. Thus, a purchase made for an item on a shopping list, e.g., with one of the user's credit cards, may result in removing the item from the shopping list as well as turning off or clearing a notification that was set to remind the user to make the shopping list purchase.

According to an embodiment, a virtual reminder need not always persist or be displayed. Rather, the display or delivery of the virtual notification may be triggered by various data. For example, if a user adds an item a grocery list, a virtual notification for reminding the user to purchase that item is not necessarily persistently displayed. Rather, according to an embodiment, the virtual reminder to purchase the item may be displayed at a particular time, e.g., when the user is detected at his or her computer, when the user is detected to be located at a particular virtual location, e.g., when the user is at a particular web site. Likewise, the virtual reminder may be displayed on a particular day where a travel route takes the user near a grocery store, etc. Thus, the virtual reminder may be provided based on various data, e.g., current or future (predicted) location, current device activity or use context, etc. Therefore, when a user arrives at a certain location, or performs a certain activity, e.g., joins a video conference call, the presence of that data may trigger presentation of, as well as dismissal of, the virtual notification.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at an electronic device, data associated with a notification comprising a reminder related to a task of a user;
   modifying, using a processor, an output based on the data, wherein the modifying comprises modifying an attribute of the notification based upon the task, wherein the modifying is based upon a type of the task and a temporal characteristic of the task;
   providing, using an output device of the electronic device, the modified output as a notification; and
   dismissing the notification upon detection of completion of the task, the detection of completion being based upon at least one of: a correlation of a location of the user and the task and transactional data from a source other than the electronic device.

2. The method of claim 1, wherein the providing comprises increasing an intensity of the notification over a period of time.

3. The method of claim 2, wherein the increasing progresses according to a policy.

4. The method of claim 1, wherein the notification comprises a change to a displayed color.

5. The method of claim 4, wherein the displayed color is displayed on a sub-portion of a display screen.

6. The method of 1, wherein providing of the notification comprises relocation of a display screen element.

7. The method of claim 1, wherein providing of the notification comprises a change in size of a display screen element.

8. The method of claim 1, further comprising providing the notification on at least one other user device.

9. The method of claim 1, further comprising:
   detecting, using a processor of an electronic device, an event;
   identifying, using the processor, data indicating that the event has occurred, wherein said data is not obtained from user input at the electronic device; and
   automatically clearing the notification based on the data indicating that the event has occurred.

10. The method of claim 9, wherein the data is selected from the group consisting of transactional data, web browsing data, and geographic location data.

11. The method of claim 9, wherein the data is geographic location data obtained from a global positioning satellite (GPS) system.

12. The method of claim 9, wherein the data is time data.

13. The method of claim 9, wherein the data is obtained from a remote device.

14. A method, comprising:
   detecting, using a processor of an electronic device, an event having an associated time comprising a reminder related to a task of a user;
   displaying a notification for the event based upon the task;
   identifying, using the processor, data other than time data indicating that the event has occurred, wherein said data is not obtained from user input at the electronic device, wherein the identifying is based upon a type of the task and a temporal characteristic of the task; and
   dismissing the notification upon detection of completion of the task, the detection of completion being based upon at least one of: a correlation of a location of the user and the task and transactional data from a source other than the electronic device.

15. An apparatus, comprising:
   an output device;
   a processor operatively coupled to the output device; and
   a memory that stores instructions executable by the processor to:
   detect data associated with a notification comprising a reminder related to a task of a user;
   modify an output based on the data, wherein to modify comprises to modify an attribute of the notification based upon the task, wherein to modify is based upon a type of the task and a temporal characteristic of the task;
   provide, using the output device, the modified output as a notification; and
   dismissing the notification upon detection of completion of the task, the detection of completion being based upon at least one of: a correlation of a location of the user and the task and transactional data from a source other than the electronic device.

16. The apparatus of claim 15, wherein the instructions executable by the processor to provide comprises instructions that increase an intensity of the notification over a period of time.

17. The apparatus of claim 16, wherein the intensity is increased according to a policy.

18. The apparatus of claim 16, wherein the notification comprises a change to a displayed color.

19. The apparatus of claim 18, wherein the displayed color is displayed on a sub-portion of a display screen.

20. The apparatus of claim 15, wherein the instructions executable by the processor to provide comprise instructions that relocation of a display screen element.

21. The apparatus of claim 15, wherein the instructions executable by the processor to provide comprise instructions that change a size of a display screen element.

22. The apparatus of claim 15, further comprising instructions that are executable by the processor to provide the notification on at least one other user device.

23. The method of claim 15, further comprising instructions executable by the processor to:
- detect an event;
- identify data indicating that the event has occurred, wherein said data is not obtained from user input at the electronic device; and
- automatically clear the notification based on the data indicating that the event has occurred.

24. The apparatus of claim 23, wherein the data is selected from the group consisting of transactional data, web browsing data, and geographic location data.

25. The apparatus of claim 24, wherein the data is geographic location data obtained from a global positioning satellite (GPS) system.

26. The apparatus of claim 23, wherein the notification is a virtual notification.

27. A program product, comprising:
- a computer readable storage device comprising code executable by a processor, the code comprising:
- code that detects, at an electronic device, data associated with a notification comprising a reminder related to a task of a user;
- code that modifies, using a processor, an output based on the data, wherein the modifying comprises modifying an attribute of the notification based upon the task, wherein the code that modifies is based upon a type of the task and a temporal characteristic of the task;
- code that provides, using an output device of the electronic device, the modified output as a notification; and
- code that dismisses the notification upon detection of completion of the task, the detection of completion being based upon at least one of: a correlation of a location of the user and the task and transactional data from a source other than the electronic device.

* * * * *